March 31, 1970 L. W. HAAKER ET AL 3,503,273
WRIST JOINT
Filed Nov. 8, 1968 3 Sheets-Sheet 1

INVENTORS
LESTER W. HAAKER
DEMETRIUS G. JELATIS
BY
Burd, Braddock & Bartz
ATTORNEYS March 31, 1970 L. W. HAAKER ET AL 3,503,273
WRIST JOINT
Filed Nov. 8, 1968 3 Sheets-Sheet 3
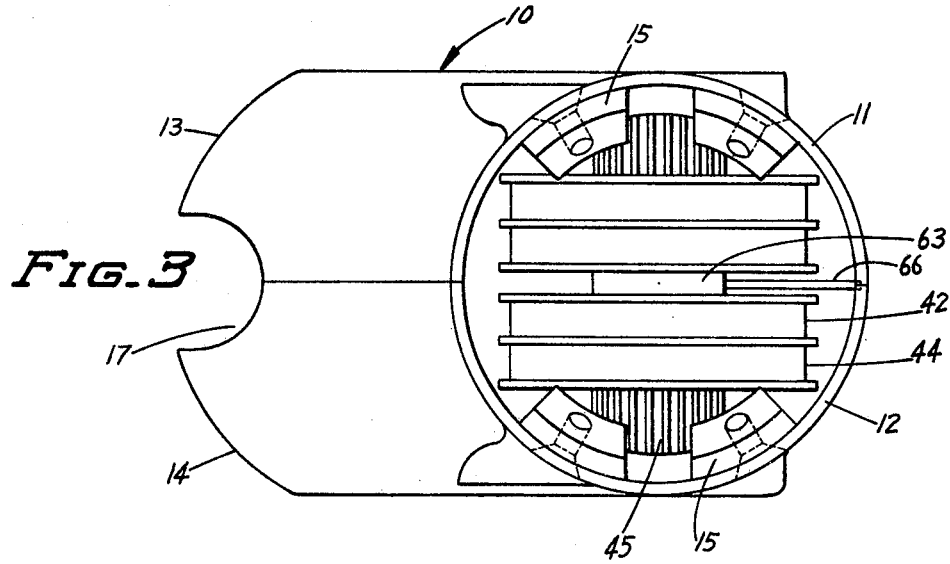
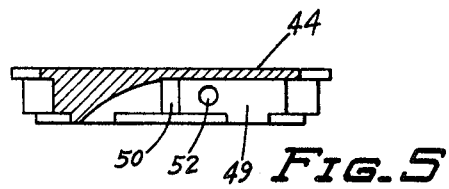
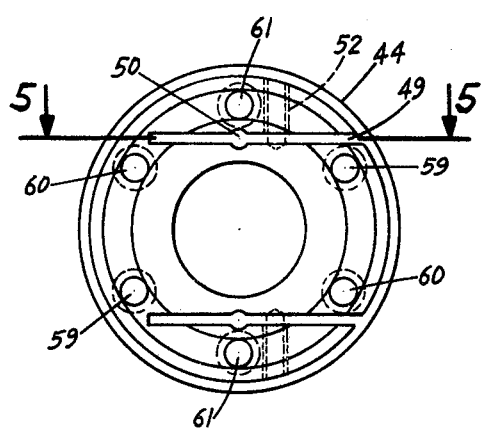 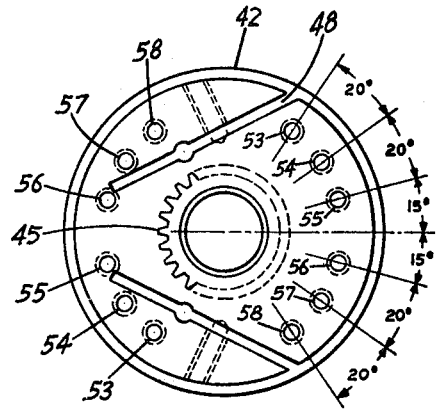
INVENTORS
LESTER W. HAAKER
DEMETRIUS G. JELATIS
BY
Burd, Braddock & Bartz
ATTORNEYS United States Patent Office 3,503,273
Patented Mar. 31, 1970

3,503,273
WRIST JOINT
Lester W. Haaker and Demetrius G. Jelatis, Red Wing, Minn., assignors to Central Research Laboratories, Inc., Red Wing, Minn., a corporation of Minnesota
Filed Nov. 8, 1968, Ser. No. 774,467
Int. Cl. F16h *1/06;* B25j *3/00*
U.S. Cl. 74—89.16                           9 Claims

ABSTRACT OF THE DISCLOSURE

A wrist joint for mounting the handle and tong means of a remote control master-slave manipulator characterized by increased work load capacity without excessive tape deflection through increased tape drum speed and increased rigidity. These results are accomplished by transmission of elevation and twist motions to the tape drums through a pair of differential gears to a pair of cluster gears and a pair of idlers to the drums. The wrist joint assembly is separable vertically to permit access for ease of initial assembly and adjustment. The tape drums are composed of two relatively movable segments having means of attachment permitting a plurality of assembly positions for adjustment of tape tension.

This invention relates to a new and improved wrist joint for a remote control master-slave manipulator of the type which is used by an operator to perform certain manipulative functions in some area remote from the operator as, for example, on the opposite side of a shielding wall. Such manipulators are well known and widely used. One such manipulator, to which the wrist joint of the present invention is especially adapted, is illustrated and described in United States Patent No. 2,771,199 issued on Nov. 20, 1956 to Demetrius G. Jelatis, one of the instant co-inventors.

Manipulators of this general type comprise a horizontal tubular support usually mounted in a sleeve or tube so as to extend through a generally vertical shielding wall and to be rotatable therein. A master arm is suspended from one end of the horizontal support on one side of the wall and a slave arm is suspended from the opposite end on the other side of the wall. Both master and slave arms include a relatively stationary portion which is attached to the horizontal support and rotates with it on its horizontal axis and a relatively movable portion which is movable longitudinally relative to the stationary portion. The relatively stationary portions are pivotally attached to the horizontal tubular support and movable on those pivots, whereas the relatively movable parts are movable toward and away from those pivots.

A handle is supported from the lower end of the movable part of the master arm to be engaged by the hand of the operator and by appropriate motions transmitted along the master arm through the horizontal support and along the slave arm controls the movement of a tong means supported from the lower end of the movable part of the slave arm. The wrist joint of the present invention provides the means by which the handle and tong means are connected to the master and slave arms respectively and function to initiate transmission of motions from the handle to the tong means.

Remote control manipulators of the type exemplified by U.S. Patent No. 2,771,199 are normally intended for the handling of light to moderate weight loads. However, from time to time such manipulators may be used with greater than normal loads. It has been found that when this is done there is excessive deflection of the tapes transmitting elevation and twist motions from the handle to the tong means. It is the principal object of the present invention to provide a wrist joint which reduces such excessive tape deflection and imparts greater rigidity to the assembly permitting utilization of the manipulator for handling heavier than normal loads.

The invention is illustrated in the accompanying drawings in which:

FIGURE 3 is a top plan of the wrist joint assembly;

FIGURE 4 is an elevation of the face of one tape drum segment;

FIGURE 5 is a section on the line 5—5 of FIGURE 4 and in the direction of the arrows; and FIGURE 6 is an elevation of the face of the other segment comprising a tape drum.

Figure 1:
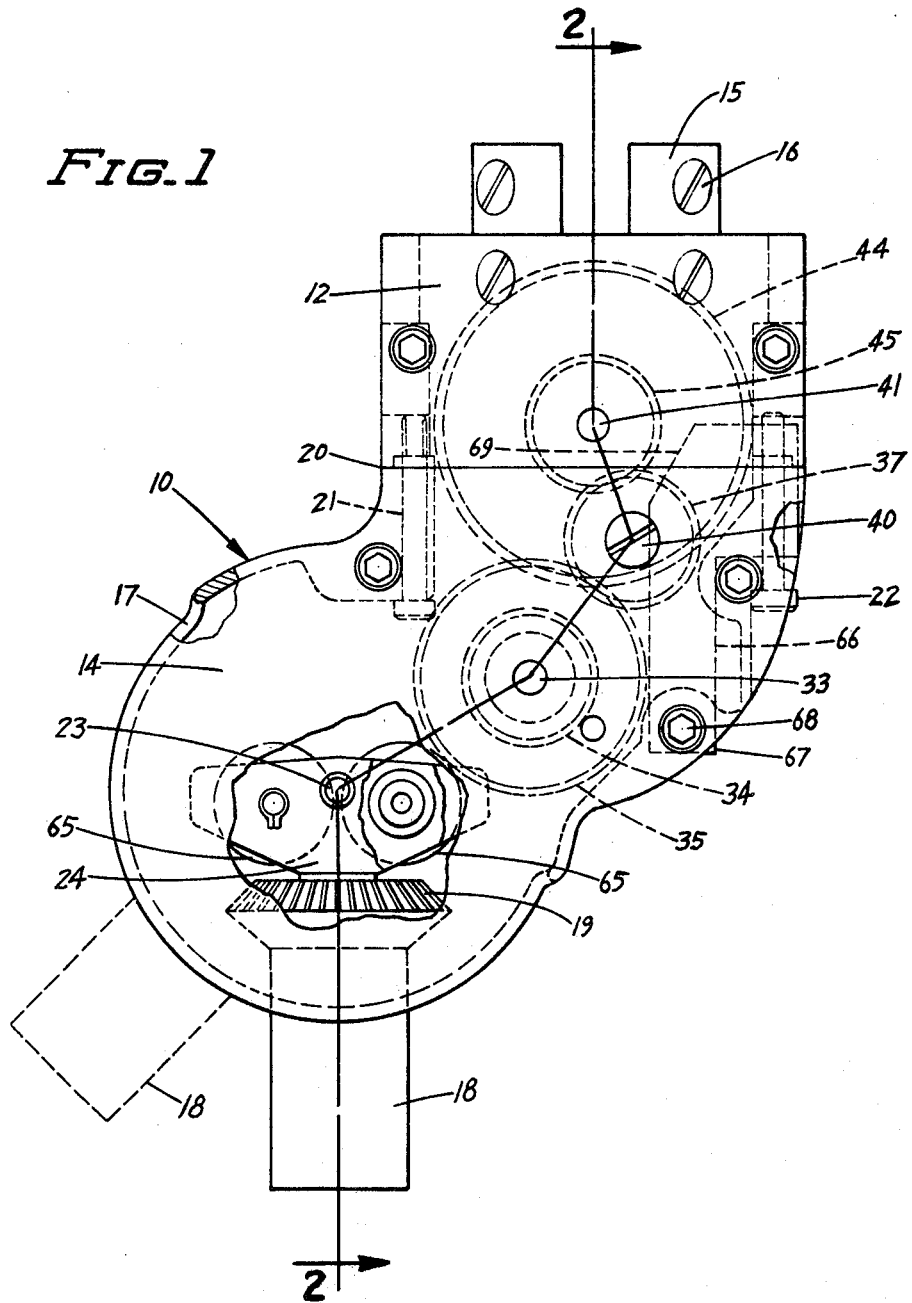
FIGURE 1 is a side elevation of the wrist joint assembly partly broken away to show interior construction.
Figure 2:
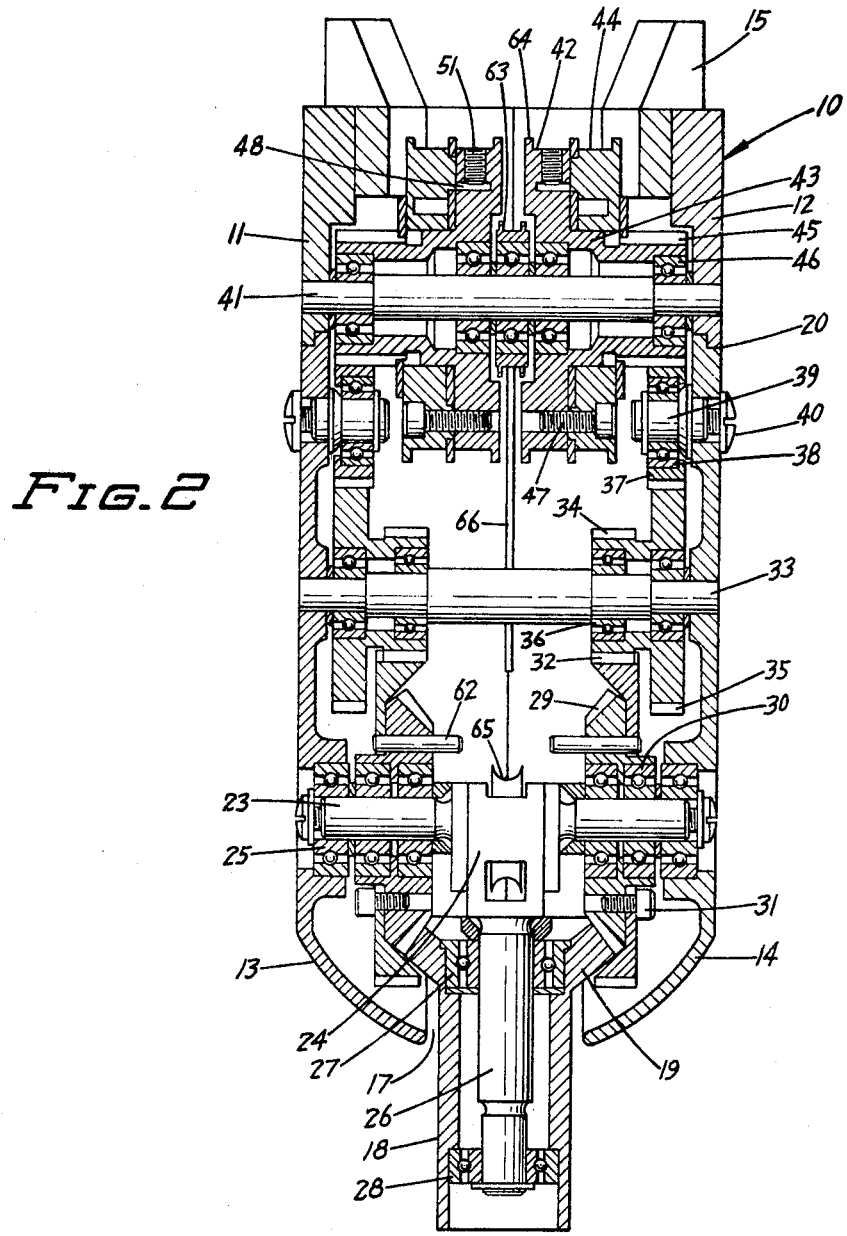
FIGURE 2 is a section on the line 2—2 of FIGURE 1 and in the direction of the arrows.

Referring now to the drawings, the wrist joint assembly as shown in elevation in FIGURE 1 represents a left hand elevation from the operator's point of view. The same wrist joint in the same relative position is employed on both the master and slave arms. In virtually all instances the manipulators of which the wrist joints form a part are employed in spaced pairs so that the operator, by means of the use of two master control arms, is able to manipulate two slave arms in order to reproduce the action of a pair of hands in the remote area on the other side of the shielding wall.

The wrist joint assembly, indicated generally at 10, is enclosed in a housing whose upper portion is composed of a pair of complementary semi-cylindrical shell members 11 and 12 and whose lower portion is composed of a pair of complementary downwardly and forwardly extending hollow shell members 13 and 14 which are connected to the semi-cylindrical members 11 and 12, respectively. The top of the housing is open. Each of the upper housing members 11 and 12 is provided with a pair of upstanding arcuate ears 15 by means of which the wrist joint housing may be attached to the lower end of a master arm or slave arm boom tube and secured, as by means of screws 16. The remainder of the housing is closed except for a wide central slot 17 in the forward and downwardly extending surfaces of the lower housing portion to permit elevation movements of the handle and tong means to be transmitted by virtue of the tubular shank 18 of a bevel gear 19 which extends through that slot. The upper and lower housing portions are desirably joined in a half lap butt joint 20 and are connected by two pairs of screws 21 and 22 for easy vertical separation.

The trunnions 23 of yoke 24 are journaled in a pair of ball bearings 25 carried in the opposite side walls of the lower portion of the assembly housing. A shaft 26 extends from yoke 24 and carries a pair of ball bearings 27 and 28 by means of which the tubular shank 18 of bevel gear 19 is journaled for rotation about an axis perpendicular to the axis of rotation of the yoke trunnions. The handle and tong means of the manipulator are carried by tubular shank 18. Bevel gear 19 meshes with a pair of bevel differential gears 29 which are journaled by means of two pairs of ball bearings 30 to rotate on trunnions 23 of yoke 24 and are secured, as by means of screws 31 to spur gears 32 for rotation together.

A stationary shaft 33, whose ends are supported in the opposite sides of the lower housing portion, carries a pair of two part cluster gears 34–35 which are journaled by means of two pairs of ball bearings 36. Cluster gear 34–35 is designed to give a higher gear ratio. Gear section 34 which is of smaller diameter meshes with spur gear 32 secured to the differential bevel gears 29. Cluster gear section 35 of larger diameter meshes with a pair of idler spur gears 37 journaled by means of bearings 38 carried by a pair of stub shafts 39 extending inwardly from the opposite side walls of the lower housing section secured by screws 40.

The novel two part elevation and twist tape drums are carried by a stationary horizontal shaft 41 whose ends are supported in opposite side walls of the upper portion of the wrist joint assembly housing. Each drum is composed of an inner flanged drum segment 42 having a hub 43 of reduced diameter on which is mounted an outer flanged drum segment 44. The inner drum segment 42 also has an outwardly extending gear toothed tubular hub extension 45 whose teeth mesh with the teeth of idler spur gear 37. The tape drum assembly is journaled for rotation about shaft 41 by means of pairs of bearings 46. Both drum segments are of the same diameter and are secured together, as by means of screws 47, to rotate together as a unit.

As is well understood in the art, the elevation and twist tapes, or similar linear motion transmission elements, extend in opposite directions in their respective grooves or channels of the composite tape drum so that, as the drum is rotated, one tape is being wound about the drum as the other is being unwound. As best seen by reference to FIGURES 4, 5 and 6, the drum segments 42 and 44 are provided with tape receiving slots 48 and 49, respectively. As best seen in FIGURE 5, to avoid undue weakening of the structure, the slots extend only part way through each tape drum segment. To provide a positive square ended stop for the tape ends, a pin receiving hole 50 is drilled crosswise of the slot. After the tape end is inserted into the slot until it comes into abutment with the pin, it is secured by a set screw 51 in tapped hole 52 which extends perpendicular to the plane of the tape end.

It will be noted that the entire wrist joint assembly may be separated vertically along joint 20. When the assembly is separated gears 45 are lifted out of engagement with gears 37. This permits easy access to the tape drums for initial assembly, adjustment of proper tape tension and repair.

In many manipulators the travel paths of the tapes transmitting elevation and twist motions are relatively short. In such a case, where there is room for unobstructed movement of the bulky clamp, the tapes may be adjusted to proper tension and then clamped. In other manipulators, the length of the paths of travel of the elevation and twist tapes is greater such that no room exists for movement of tape clamps on a path of the required length so that the use of clamps is precluded. The adjustable two part tape drums of the wrist joint of the present invention eliminate the need for such tape clamps by permitting the tapes to be strung in unbroken lengths all the way from master wrist joint to slave wrist joint in most manipulators, or from wrist joint to transfer drum in sealed manipulators such as those of United States Patent No. 3,164,267 and United States Ser. No. 590,274 filed Oct. 28, 1966.

In order to facilitate tensioning of the tape, means are provided for fastening the segments of the tape drums together in a multiplicity of different relative positions. This is accomplished by means of a plurality of pairs of complementary holes in which fastening screws 47 may be inserted. Comparing FIGURES 4 and 6, which are elevations of the faces of the drum segments, it will be noted that drum segment 42 is provided with a plurality of diametrically spaced apart screw receiving holes 53–58 spaced apart around the drum segment equally spaced from the axis of rotation and at various radial angles as shown in FIGURE 6. Drum segment 44 is similarly provided with three pairs of diametrically opposite screw receiving holes 59–61 evenly spaced at 60 degree radial angles and the same distance from the axis of rotation as holes 53–58.

The drum segments as illustrated are assembled in face-to-face relation. If it is assumed that drum segment 44 is disposed on top of drum segment 42 with holes 53 and 59 in registry, this represents one of 36 different assembly positions of the drum segments. If the drum segment 42 is maintained stationary and drum segment 44 is rotated clockwise 10 degrees, holes 56 and 61 come into registry. By rotating drum segment 44 clockwise another 10 degrees, holes 54 and 59 come into registry. The sequence continues as follows: 54–59, 57–61, 55–59, 58–61, 53–60, 56–59, 54–60, 57–59, 55–60, 58–59, 53–61, 56–60, 54–61, 57–60, 55–61, 58–60; and then back to holes 53 in registry with holes 59. The pattern is then repeated to complete one rotation of drum segment 44 relative to drum segment 42. By this means the tape drum segments can be secured together to rotate as a unit in any one of 36 different relative positions. In assembling or adjusting the wrist joint, the drum segments with tapes secured in the conventional overall elevation and twist assembly are rotated relative to one another until the proper tape tension is achieved. Then the drum segments are secured together in the closest pair of mating holes.

Each of the composite tape drums rotates independently of the other. In use, the paired tape couplings are continuous from one composite drum in the wrist joint at the master end of the manipulator to the corresponding drum at the slave end in such manner that, with the tapes under pre-tension, motion can be efficiently transferred between master and slave end drums without backlash. The drums are completely independent. They rotate in opposite directions at the same speed under pure twist rotation. They rotate in the same direction at equal speeds under pure elevation rotation. Under combined elevation and twist movements, they can rotate at any combination of speeds and direction. One drum pair can be held stationary and the other rotated to produce a combined elevation and twist movement.

Angular movement of the yoke 24 about the trunnions 23 is limited by means of the ends of the slot opening 17 in the wrist joint housing through which the shank of bevel gear 19 extends. Pins or pegs 62 set in the differential gears 29–32 limit the movement of the differential gears in both directions by coming into engagement with the yoke body. This has the effect of limiting tape movements of the drums which are directly interconnected with the differential gears.

A guide pulley 63 is journaled on the shaft 41 by means of ball bearing 64 between the pair of tape drums. Pulley 63 is adapted to be engaged by a tong cable which extends thereover, being guided from the handle or tong means between two guide pulleys 65 journaled in the yoke 24. The cable extends on through the hollow shaft 26 of the yoke to the handle of the master arm to which the wrist joint is attached and to the tong means of the slave arm, the cable extending between the master and slave arms through the horizontal support.

A central vertical tongue 66 is desirably provided as shown for the purpose of aligning and preventing relative rotation of the upper and lower segments of the housing. The heel 67 of tongue 66 engages recesses in the lower housing members 13 and 14 and the tongue is secured by means of screw 68. The upper end of tongue 66 engages recesses in the lower edges of upper housing members 11 and 12 at their point of abutment at the back of the housing. Tongue 66 performs a dual function in that its forward sloping face 69 serves as a cable guard to retain the tong cable in pulley 63.

Because of the relative proportions of the tape drums, their spur gears 45, interconnecting spur gears 37, 35, 34 and differential gears 29–32, as illustrated, a point on the tape drums will move about 5.7 times as far as points on the pitch circles of the differential gears 29 and thus, the load transmitted to the tapes is about ⅙ that imposed at the differential gears. The increased gear ratios of the wrist joint introduces increased load carrying capabilities and at the same time results in increased rigidity, rigidity being increased by a factor which is the square of the gear ratio.

The embodiments of the invention in which an exclusive property and privilege is claimed are defined as follows:

1. A wrist joint for a remote control master-slave manipulator comprising:
   (A) a housing including separate upper and lower portions;
   (B) a pair of take-up means for linear motion transmission elements journaled to rotate within the upper portion of said housing, each of said take-up means being rotatable independently and each having a pair of circumferential channels for receiving linear motion transmission elements wrapped in opposite directions;
   (C) gear means secured to each of said take-up means;
   (D) a pair of idler gears journaled in the lower portion of said housing, the teeth thereof engaging the teeth of the gears of said take-up means;
   (E) a pair of two part cluster gears journaled in the lower portion of the housing, the teeth of the first part of said cluster gears engaging the teeth of said idler gears;
   (F) a yoke journaled for limited pivotal movement in the lower portion of said housing;
   (G) a pair of spur gears journaled on the trunnions of said yoke, the teeth thereof engaging the teeth of the other part of said cluster gears;
   (H) a pair of differential bevel gears journaled to rotate with said spur gears;
   (I) a bevel gear supported from said yoke and journaled for rotation about an axis perpendicular to the axis of rotation of said differential bevel gears, the teeth thereof engaging the teeth of said differential gears; and
   (J) means for securing the upper and lower portions of said housing together whereby the housing portions and mechanisms contained therein are separable.

2. A manipulator wrist joint according to claim 1 further characterized in that the parts of said cluster gears are of differing diameters, the larger diameter gear parts engaging said idler gears and the smaller diameter gear parts engaging said spur gears.

3. A manipulator wrist joint according to claim 1 further characterized in that:
   (A) said take-up means each include a pair of flanged circular segments for receiving linear motion transmission elements;
   (B) said segments being movable relative to one another about their axes of rotation; and
   (C) fastening means are provided for securing said segments together in any of a plurality of relative positions.

4. A manipulator wrist joint according to claim 3 further characterized in that:
   (A) one of said take-up means segments is provided with a plurality of holes for receiving fastening elements, said holes being evenly spaced about the circumference of said segment; and
   (B) the other of said take-up means segments is provided with a larger plurality of holes for receiving fastening elements, said holes being spaced from the axis of rotation by the same distance but spaced about the circumference of said segment by different angles than the holes of said first segment, whereby, as the segments are rotated relative to one another, a succession of different holes come into registry to permit insertion of fastening elements to secure the segments together in a plurality of different relative positions.

5. A manipulator wrist joint according to claim 4 further characterized in that said holes for receiving fastening elements are disposed in pairs in diametrically opposite positions, a succession of different pairs of holes coming into registry to permit insertion of pairs of fastening elements as the take-up means segments are rotated relative to one another.

6. A wrist joint for a remote control master-slave manipulator comprising:
   (A) a housing including separate upper and lower portions;
   (B) a pair of take-up means for linear motion transmission elements journaled to rotate within the upper portion of said housing, each of said take-up means being rotatable independently and each having a pair of circumferential channels for receiving linear motion transmission elements wrapped in opposite directions;
   (C) gear means secured to each of said take-up means;
   (D) means including a pair of spur gears journaled in the lower portion of said housing;
   (E) said spur gears being operatively connected to the gears of said take-up means and to work performing means carried by the lower portion of the housing;
   (F) means for securing the upper and lower portions of said housing together whereby the housing portions and mechanisms contained therein are separable.

7. A manipulator wrist joint according to claim 6 further characterized in that:
   (A) said take-up means each include a pair of flanged circular segments for receiving linear motion transmission elements;
   (B) said segments being movable relative to one another about their axes of rotation; and
   (C) fastening means are provided for securing said segments together in any of a plurality of relative positions.

8. A manipulator wrist joint according to claim 7 further characterized in that:
   (A) one of said take-up means segments is provided with a plurality of holes for receiving fastening elements, said holes being evenly spaced about the circumference of said segment; and
   (B) the other of said take-up means segments is provided with a larger plurality of holes for receiving fastening elements, said holes being spaced from the axis of rotation by the same distance but spaced about the circumference of said segment by different angles than the holes of said first segment, whereby, as the segments are rotated relative to one another, a succession of different holes come into registry to permit insertion of fastening elements to secure the segments together in a plurality of different relative positions.

9. A manipulator wrist joint according to claim 8 further characterized in that said holes for receiving fastening elements are disposed in pairs in diametrically opposite positions, a succession of different pairs of holes coming into registry to permit insertion of pairs of fastening elements as the take-up means segments are rotated relative to one another.

References Cited

UNITED STATES PATENTS

| | | | |
|---|---|---|---|
| 3,111,230 | 11/1963 | Pesenti | 214—1 |
| 3,315,542 | 4/1967 | Fortin et al. | 74—665 |

FRED C. MATTERN, Jr., Primary Examiner

WESLEY S. RATLIFF, Jr., Assistant Examiner

U.S. Cl. X.R.

74—606, 665; 214—1